United States Patent [19]
Cannan et al.

[11] Patent Number: 5,484,231
[45] Date of Patent: Jan. 16, 1996

[54] DISPOSAL OF SLURRIES OF MUNICIPAL WASTE IN DEEP GEOTHERMAL RESERVOIRS

[75] Inventors: William L. Cannan, Mandeville, La.; Alfred R. Jennings, Jr., Plano, Tex.

[73] Assignee: Mobil Oil Corporation, Fairfax, Va.

[21] Appl. No.: 158,333

[22] Filed: Nov. 29, 1993

[51] Int. Cl.$^6$ ................................................ B09B 3/00
[52] U.S. Cl. ........................ 405/128; 210/747; 405/59; 588/250; 166/271
[58] Field of Search .................... 405/128, 52, 58, 405/131, 129; 210/747, 750, 751; 166/271, 272, 268

[56] References Cited

U.S. PATENT DOCUMENTS

| | | | |
|---|---|---|---|
| 3,988,895 | 11/1976 | Sheinbaum | 60/641 |
| 4,167,099 | 9/1979 | Wahl, III et al. | 60/641 |
| 4,272,961 | 6/1981 | Sadhunkhan | 60/641 |
| 4,473,120 | 9/1984 | Jennings | 166/302 |
| 4,787,452 | 11/1988 | Jennings, Jr. | 166/272 |
| 4,826,769 | 5/1989 | Menger | 435/167 |
| 4,845,034 | 7/1989 | Menger et al. | 435/167 |
| 5,182,021 | 1/1993 | Spector | 210/605 |
| 5,246,596 | 9/1993 | Baldwin, Jr. et al. | 210/750 |
| 5,261,766 | 11/1993 | Anderson | 405/129 |

*Primary Examiner*—Dennis L. Taylor
*Attorney, Agent, or Firm*—Alexander J. McKillop; George W. Hager, Jr.; Charles A. Malone

[57] ABSTRACT

A process for obtaining decomposition products from a slurry of municipal waste by use of a geothermal reservoir. The process comprises placing the slurry of municipal waste into a geothermal reservoir; sealing the opening of the geothermal reservoir; and retorting the municipal waste slurry in the geothermal reservoir for a time sufficient to liberate methane, ammonia, urea, nitrites, nitrates, and phosphates from said slurry. Thereafter, the liberated products are removed from the geothermal reservoir and separated.

17 Claims, 2 Drawing Sheets

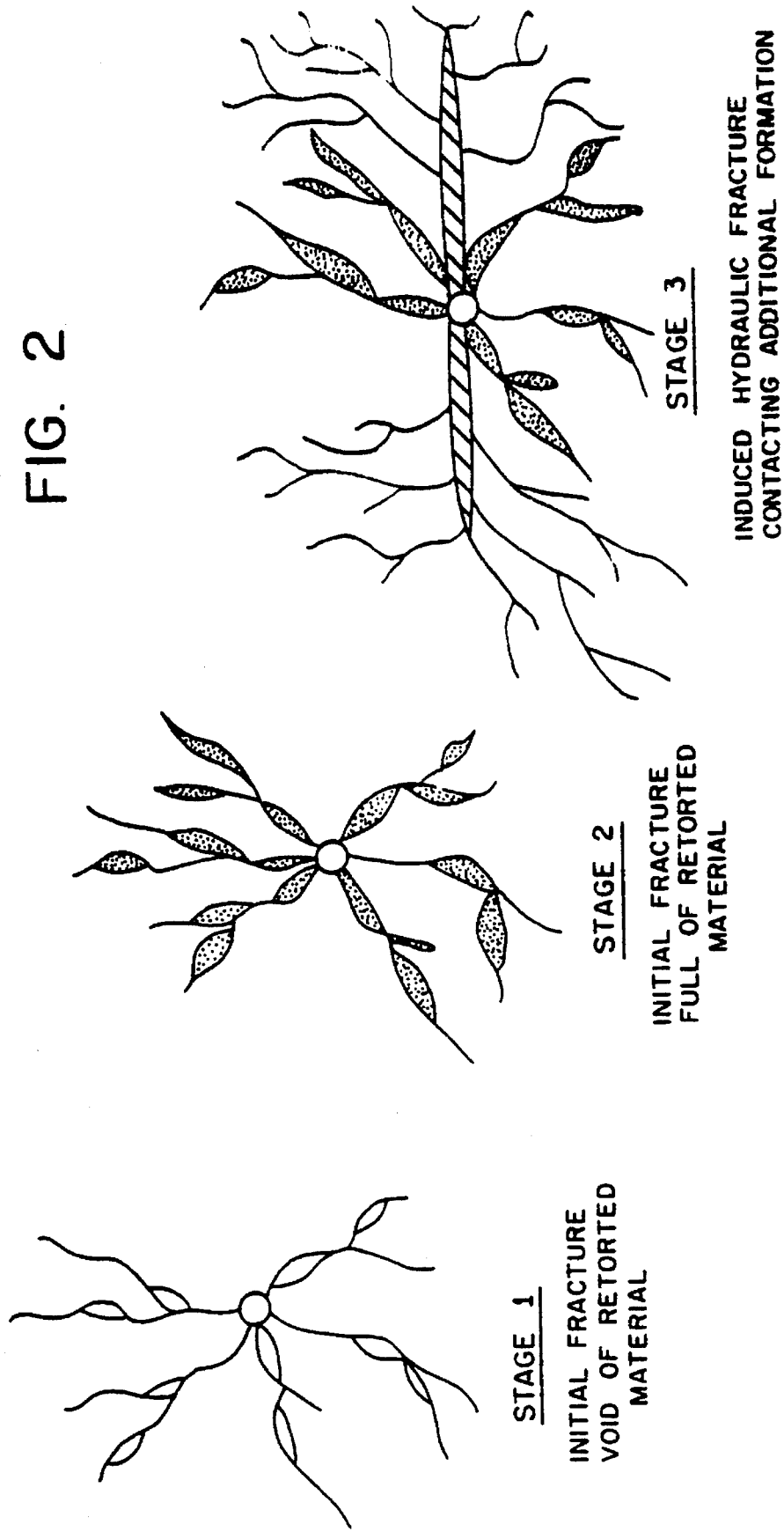

DISPOSAL OF SLURRIES OF MUNICIPAL WASTE IN DEEP GEOTHERMAL RESERVOIRS

FIELD OF THE INVENTION

This invention relates generally to the treatment of municipal wastewater or sludge slurries in geothermal wells or reservoirs to reclaim valuable by-products.

BACKGROUND OF THE INVENTION

Eutrophication of our lakes and rivers has led to increased demands for nutrient control in wastewater treatment plants. Governmental agencies have enacted increasingly stringent regulations controlling the amount of nutrients which can be discharged into receiving waters. Since conventional treatment processes remove only small amounts of nitrogen and phosphate, wastewater treatment plants will be required to change or modify their processes to meet these increasingly stringent regulations. Unfortunately, the technology to achieve the required removal efficiencies is lagging behind regulatory requirements.

One approach for accomplishing nutrient removal is biological treatment in a modified activated sludge system without chemical addition. Numerous biological nutrient removal processes have been developed. These biological nutrient removal processes typically use a single sludge configuration in which the organic matter of the influent is used as the carbon and energy source for nitrogen and phosphate removal. This allows for lower operating costs in nitrogen and phosphate removal. This also allows for lower operating costs in comparison to multiple sludge systems and other physical-chemical systems. A biological process for enhanced removal of ammonia, nitrite, nitrate, and phosphate from wastewater is disclosed in U.S. Pat. No. 5,182,021 which issued to Spector on Jan. 26, 1993. This patent is incorporated herein by reference.

As for human wastes, as late as 1945, it was the accepted practice of many municipalities to dispose of human waste by flushing or dumping the waste into bodies of water with reliance upon the dissolved oxygen content of the water to effect biological purification. With the development of the concepts of environmental control, there was increasing public condemnation of such pollution of streams and lakes which resulted in the development of methods, such as the activated sludge process, of treating municipal sewage that are less subject to objection.

Unfortunately, typical sewage contains a broad variety of pathogens such as bacteria, fungi, viruses, parasites, and protozoans. If significant amount of pathogens are present, use of such material as landfill, fertilizer or erosion material can be dangerous. Baldwin, Jr. et al. in U.S. Pat. No. 5,246,596 that issued on Sep. 21, 1993 discloses a method for processing waste to render it fit for ultimate disposal. The waste stream was first contacted together with an ammonia source capable of evolving ammonia for treating the waste, $Ca(OH)_2$, a pozzolanic chemical and at least one pozzolanic accelerator in a manner to cause pozzolanic stabilization reactions to occur thereby increasing the solids percentage of the reaction mixture. After heating the mixture, ammonium gas is evolved which neutralizes pathogens present in the waste stream and forms a treated waste stream suitable for ultimate disposal.

Various methods are known for utilizing geothermal steam or brine for electrical power generation. Thus, according to one procedure, hot geothermal brine is directly flashed and the resulting flashed steam is then expanded through a turbine for electrical generation. According to another mode of procedure, a tube and shell heat exchange apparatus is employed for indirect heat exchange contact between hot brine on one side and water or a working fluid on the other side. The heated steam or working fluid is then passed to the turbine for generating power. Such methods are described for example, in Geothermal Energy Utilization by Edward F. Wahl, John Wiley & Sons, New York (1977).

According to a third method, direct contact heat exchange is provided between geothermal brine and an immiscible (e.g., isobutane) working fluid, and the working fluid is expended through a turbine to produce electrical energy. Illustrations of the latter system are those disclosed in U.S. Pat. No. 3,988,895 to Sheinbaum, application Ser. No. 589,068, filed Jun. 23, 1975, now abandoned by S. F. Woinsky, application Ser. No. 873,264 of E. F. Wahl et al., filed Jan. 30, 1978, now U.S. Pat. No. 4,167,099 and application Ser. No. 50,868 of P. Sadkukhan, filed Jun. 21, 1979, now U.S. Pat. No. 4,272,961.

U.S. Pat. No. 4,473,120 that issued to Jennings on Sep. 25, 1984, teaches a method for retorting oil shale where a geothermal reservoir is utilized. None of the above methods disclose using a geothermal reservoir to dispose of municipal wastes.

Therefore, what is needed is a method for the disposal of municipal waste which can be conducted in a safe and efficient manner while additionally obtaining valuable by-products.

SUMMARY OF THE INVENTION

The present invention is directed to a process for obtaining methane, ammonia, and urea from a slurry of municipal waste by use of a geothermal reservoir. The process comprises placing the slurry of municipal waste into a geothermal reservoir; sealing the opening of the geothermal reservoir; and retorting the municipal waste slurry in the geothermal reservoir for a time sufficient to liberate methane, ammonia, and urea from said slurry. Thereafter, the liberated products are removed from the geothermal reservoir and separated.

Also provided for is a process for retorting and accumulating solids resultant from the in-situ geothermal compartment or reservoir retorting of the municipal waste until the compartment or reservoir is filled. Once filled, hydraulic rock fracturing pressure is applied to the reservoir for a time sufficient to cause the compartment or reservoir with retorted solids therein to fracture and form another compartment or geothermal reservoir.

It is therefore an object of this invention to place a municipal waste slurry in a geothermal well thereby safely and efficiently disposing of the municipal waste while obtaining methane, ammonia, and urea therefrom.

It is another object of this invention to provide for a method of municipal waste disposal which will eliminate eutrophication of lakes and rivers.

It is a further object of this invention to provide for a method for the disposal of municipal waste which minimizes health hazards associated with conventional disposal methods.

BRIEF DESCRIPTION OF THE DRAWINGS

FIG. 2 depicts a preferred embodiment which details the relationship between a geothermal borehole and the geothermal reservoir containing initial fractures. Various possible stages are depicted in FIG. 2 which indicates how fractures in the reservoir may be filled with resultant solids during the retorting and subsequent fracturing of the reservoir.

DETAILED DESCRIPTION OF PREFERRED EMBODIMENTS

Figure 1:
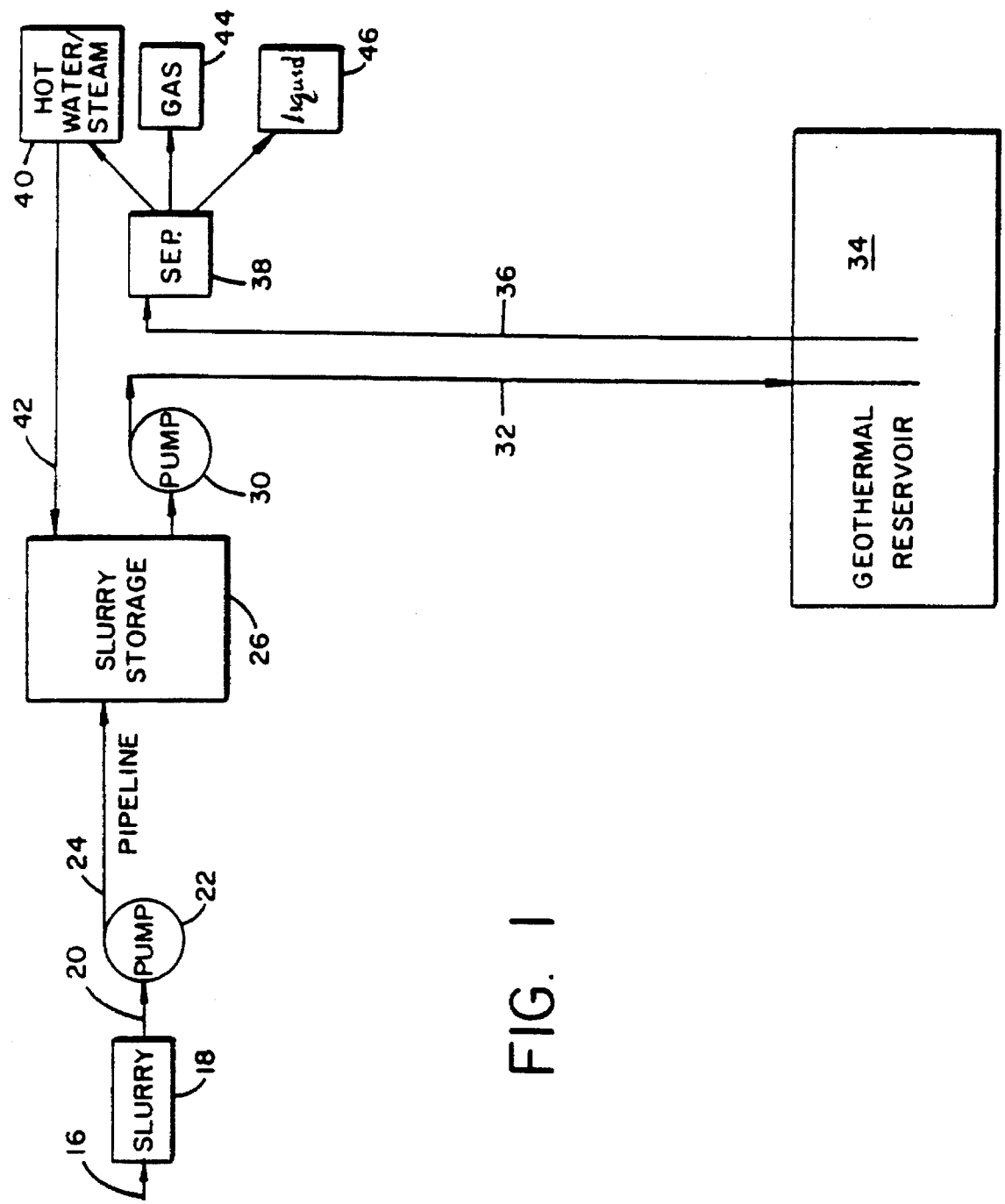
FIG. 1 is a schematic drawing of a geothermal reservoir interconnected with the steps utilized in transferring the municipal waste slurry into the reservoir along with steps for the removal of methane, ammonia, and urea from the reservoir.

In the practice of this invention, a suitable geothermal reservoir is located. Suitable geothermal reservoirs will be permeable enough to allow sufficient steam or water to enter the reservoir. Often a reservoir may be composed of rock formations which cause the reservoir to be compartmentalized. Compartments of the reservoir may be interconnected by natural fracture systems to allow steam or water to flow therebetween. Steam which forms in the reservoir creates a positive pressure beneficial in the oil shale retorting process. Temperatures in a selected reservoir should be at least 315° F. and the natural fracture system such as to facilitate the pumping of an aqueous slurry into the reservoir or a compartment thereof. FIG. 2, Stage 1 is a topical view of one possible fracture system developed in the bottom of a reservoir or a compartment thereof. To obtain a good recovery of retorted product the fracture is located in a manner as not to cause a loss of the retorted municipal waste material.

FIG. 1 is a schematic drawing depicting the preferred embodiment of this invention. Initially, a slurry of municipal waste is delivered via pipeline 16 into slurry holding tank 18. Here the slurry is mixed with water if necessary to obtain a desired solids content which will be about 5 to about 15 wt %. The wastes used herein comprise raw human waste and other similar waste from which methane, ammonia, and urea can be derived. It will generally include waste from municipal treatment facilities. Waste from other waste treatment processes include municipal waste from primary, secondary and tertiary treatment facilities. The waste processed in the present invention can generally be considered an aqueous sludge. Preferably, the aqueous sludge processed in the present invention will have in the range of about 15 to about 35 wt % solids. These and other wastes are discussed in U.S. Pat. No. 5,246,596 that issued to Baldwin, Jr. et al. on Sep. 21, 1993. This patent is hereby incorporated by reference herein.

The slurry is then transferred via line 20 into pump 22 through pipeline 24 into a slurry storage tank 26. Hot water and steam stored in tank 40 is transported via line 42 into slurry storage tank 26 to preheat the slurry as required. Heated slurry is removed from slurry storage tank 26 by pump means 30 and is pumped through line 32 into geothermal reservoir 34. Heat and pressure sensing units are placed into the reservoir or compartment until it is filled with slurry as desired. When sufficient slurry has been placed into the compartment or reservoir, the reservoir 34 is closed and retorting is commenced. Depending on the nature of the geothermal compartment or reservoir and concentration of solids contained in the slurry, the reservoir or compartment is closed for a time sufficient for the desired retorting to occur. Generally, this period will be from about 12 hours to about 72 hours. The retorting period can be either less than or greater than the specified periods. Variations in time periods can occur because of the nature and composition of the slurry as well as the kind of processing the slurry was subjected to prior to injecting into the reservoir. Afterwards, the compartment or reservoir is opened via a valve means (not shown) in piping fluidly communicating therewith. Subsequently, methane, ammonia, urea, and other products such as nitrites, nitrates, and phosphates are pumped from the reservoir via line 36 to separator 38. Separator 38 segregates the products from each other as gases 44 and liquids 46. The gases are separated into methane and ammonia. Urea and other products such as nitrites, nitrates, and phosphates are recovered from the separated liquids.

Once the products of retorting have been removed, additional slurry is pumped into the compartment or reservoir, and another retorting operation commenced. These retorting operations can be repeated until it becomes uneconomical to pump additional slurry into the reservoir. This condition may be caused by the compartment or reservoir becoming filled or when required pumping pressures become too great.

In another embodiment, formation fines are mixed with the slurry so as to dispose of both at the same time. Jennings, Jr. in U.S. Pat. No. 4,787,452 which issued on Nov. 29, 1988 discloses a method for disposal of produced formation fines during oil recovery. This patent is hereby incorporated by reference herein. When formation fines are mixed into the slurry in an amount of up to about 10 wt. percent, the reservoir or compartment can be hydraulically fractured when it becomes filled due to repeated retorting. When this occurs hydraulic fracturing pressure is applied through a borehole by means known to those skilled in the art. Pressures applied cause the formation fines to become embedded in the natural fractures as shown in FIG. 2, Stage 2 of the drawings, thereby sealing same. A method for hydraulically fracturing a geothermal reservoir is disclosed by Jennings in U.S. Pat. No. 4,473,120 that issued on Sep. 25, 1984. This patent is incorporated by reference herein.

Pressure is applied to the compartment or reservoir until fracturing occurs, and another compartment or reservoir is contacted. The pressures used to induce hydraulic fracturing will usually be from about 1,000 psi to about 20,000 psi. One possible fracturing concept is depicted in FIG. 2, Stage 3. Once fracturing has occurred additional municipal waste slurry with or without formation fines therein is pumped into the newly formed compartment or reservoir. Retorting and recovering of products is again commenced and repeated until the compartment or reservoir is again filled or pumping pressures become too high. If desired fracturing can be initiated again and the entire cycle repeated.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed:

1. A process for obtaining products from municipal waste using a geothermal steam compartment or reservoir comprising:

a) placing a slurry of municipal waste into a geothermal steam compartment or reservoir;

b) sealing the geothermal steam compartment or reservoir;

c) retorting the municipal waste slurry under retorting conditions in the geothermal steam compartment or reservoir for a time sufficient to remove recoverable products from the municipal waste; and d) removing the resultant products from the geothermal steam compartment or reservoir which products are selected from a member of the group consisting of ammonia, urea, nitrites, nitrates, phosphates, and mixtures thereof.

2. The process as claimed in claim 1 where in step a) the municipal waste is placed into the geothermal compartment or reservoir as a water/slurry with a desired solids content of about 5 to about 15 wt. %.

3. The process as recited in claim 1 where in step a) municipal waste is placed in the geothermal compartment or reservoir as a water/formation fines/municipal waste slurry.

4. The claim as claimed in claim 1 where in step c) retorting is conducted at a temperature of from about 315° F. to about 550° F.

5. A process for obtaining products from municipal waste using a geothermal steam compartment or reservoir comprising:
   a) placing municipal waste in slurry form into a geothermal steam compartment or reservoir;
   b) sealing the geothermal steam compartment or reservoir;
   c) retorting the municipal waste slurry under retorting conditions in the geothermal steam compartment or reservoir at a temperature from about 315° F. to about 550° F.;
   d) removing the resultant products from the geothermal steam compartment or reservoir which products are selected from a member of the group consisting of ammonia, urea, nitrites, nitrates, phosphates, and mixtures thereof; and
   e) repeating steps a) through d) until the geothermal steam compartment or reservoir is filled with solids from the municipal waste.

6. The process as recited in claim 5 where in step a) the municipal waste is placed into the geothermal compartment or reservoir as a water/slurry with a desired solids content of about 5 to about 15 wt. %.

7. The process as recited in claim 5 where in step a) municipal waste is placed in the geothermal compartment or reservoir as a water/formation fines/municipal waste slurry.

8. The process as recited in claim 5 where in step c) retorting is conducted at a temperature of from about 315° F. to about 550° F.

9. The process as recited in claim 5 where in step c) said slurry is retorted from about 12 to about 72 hours.

10. The process as recited in claim 1 where in step c) said slurry is retorted from about 12 to about 72 hours.

11. A process for obtaining products from municipal waste using a geothermal steam compartment or reservoir comprising:
   a) placing municipal waste in slurry form into a geothermal steam compartment or reservoir;
   b) sealing the geothermal steam compartment or reservoir;
   c) retorting the municipal waste slurry under retorting conditions in the geothermal steam compartment or reservoir at a temperature from about 315° F. to about 550° F.;
   d) removing the resultant products from the geothermal steam compartment or reservoir which products are selected from a member of the group consisting of ammonia, urea, nitrites, nitrates, phosphates, and mixtures thereof;
   e) repeating steps a) through d) until the geothermal steam compartment or reservoir is filled with solids from the municipal waste; and
   f) fracturing hydraulically said solids filled compartment or reservoir until fluid communication is made with another compartment or reservoir.

12. The process as recited in claim 11 where steps a) through f) are repeated.

13. The process as recited in claim 11 where formation fines are mixed with said slurry.

14. The process as recited in claim 11 where formation fines are mixed with said slurry and steps a) through f) are repeated.

15. The process as recited in claim 11 where in step c) retorting is conducted at a temperature of from about 315° F. to about 550° F.

16. The process as recited in claim 11 where in step c) said slurry is retorted from about 12 to about 72 hours.

17. The process as recited in claim 5 where after step e) said compartment or reservoir is hydraulically fractured.

* * * * *